United States Patent
Katayama et al.

(10) Patent No.: US 6,631,741 B2
(45) Date of Patent: Oct. 14, 2003

(54) METAL-COMPOSITE CORRUGATED HOSES AND A PROCESS FOR MANUFACTURING THE SAME

(75) Inventors: Kazutaka Katayama, Komaki (JP); Motoshige Hibino, Minokamo (JP); Atsuo Miyajima, Inuyama (JP); Hiroaki Ito, Kasugai (JP)

(73) Assignee: Tokai Rubber Industries, Ltd., Komaki (JP)

(*) Notice: Subject to any disclaimer, the term of this patent is extended or adjusted under 35 U.S.C. 154(b) by 69 days.

(21) Appl. No.: 09/864,203

(22) Filed: May 25, 2001

(65) Prior Publication Data

US 2002/0007860 A1 Jan. 24, 2002

(30) Foreign Application Priority Data

Jun. 5, 2000 (JP) .................................... 2000-171994
Jun. 5, 2000 (JP) .................................... 2000-171994

(51) Int. Cl.$^7$ .................................................. F16L 9/18
(52) U.S. Cl. ........................ 138/121; 138/137; 138/139; 138/143; 138/146
(58) Field of Search .................... 138/121, 122, 138/137, 139, 143, 146; 428/36.91

(56) References Cited

U.S. PATENT DOCUMENTS

| | | | | |
|---|---|---|---|---|
| 3,698,440 A | * | 10/1972 | Matthieu et al. | 138/149 |
| 3,771,570 A | * | 11/1973 | Coleman | 138/131 |
| 4,147,185 A | * | 4/1979 | Hines | 138/121 |
| 5,472,746 A | | 12/1995 | Miyajima et al. | 427/468 |
| 5,638,871 A | * | 6/1997 | Iorio et al. | 138/146 |
| 5,664,608 A | * | 9/1997 | Kawasaki | 138/139 |
| 5,868,171 A | * | 2/1999 | Karl | 138/139 |
| 6,030,672 A | * | 2/2000 | Usui | 138/146 |

FOREIGN PATENT DOCUMENTS

| | | |
|---|---|---|
| AT | 404 174 | 9/1998 |
| EP | 0673 697 | 9/1995 |
| EP | 0 890 768 | 1/1999 |
| JP | 07-275981 | 10/1995 |
| JP | 08-127101 | 5/1996 |
| WO | 99/58891 | 11/1999 |

* cited by examiner

Primary Examiner—James Hook
(74) Attorney, Agent, or Firm—Jacobson Holman PLLC

(57) ABSTRACT

A metal-composite corrugated hose having a wall including a metal layer forming its innermost layer and a resin layer surrounding it. Its wall has in its corrugated portion a metal layer thickness (A) of at least 20 μm, but below 200 μm, and a resin layer thickness (B) of 80 to 5,000 μm. Each thickness of A and B has a ratio (A:B) of 1:4 to 1:50. The hose is made by a specific process in which the metal and resin layers are not corrugated simultaneously. Thus, there is a provided a metal-composite corrugated hose having high fuel impermeability, flexibility and strength, and having a reinforcing effect sufficient to protect the metal layer from any fatigue failure.

11 Claims, 1 Drawing Sheet

METAL-COMPOSITE CORRUGATED HOSES AND A PROCESS FOR MANUFACTURING THE SAME

BACKGROUND OF THE INVENTION

1. Field of the Invention

This invention relates to a metal-composite corrugated hose used for conveying fluid such as fuel or a refrigerant, and a process for manufacturing the same. More particularly, it relates to a metal-composite corrugated hose which is very high in fluid impermeability and satisfactorily high in flexibility and strength, and has a corrugated portion in which a metal layer is effectively protected against fatigue failure, and a process for manufacturing the same.

2. Description of the Related Art

Various kinds of rubber hoses have usually been used as fuel hoses for motor vehicles or the like because of their high vibration-absorbability and easy assembling or flexibility. The fuel impermeability of hoses has recently been considered to be very important for the protection of the environment. Attention has, therefore, been drawn to new types of hoses including a hose formed from a resinous material which is a better fuel barrier than rubber, and a hose having a curved or corrugated portion improving its vibration-absorbability and flexibility.

It is, however, likely that the regulations prohibiting the leakage of fuel by permeation may become still stricter in the future. It will also be necessary to consider measures against carbon dioxide used as a refrigerant, or hydrogen used in a fuel cell, leaking easily by permeation. It will, therefore, be necessary to consider a metal-composite corrugated hose formed from a metal and a resin. A preferred hose has a wall formed of a barrier metal layer and a reinforcing resin layer, and having a corrugated portion.

Japanese Patent Application Laid-Open No. 275981/1995 discloses a process in which a resin-coated corrugated tube is manufactured by coating a straight metal pipe with a resin layer and corrugated by drawing or hydro-forming.

When a metal pipe coated with a resin layer is deformed for corrugation, however, it is difficult to carry out the plastic deformation of the resin layer satisfactorily before the metal pipe is deformed without breaking (for example, while it has an elongation not exceeding 20%). It is, therefore, necessary to form the metal layer with a larger thickness and the resin layer with a smaller thickness, so that the metal layer may maintain its corrugated shape by overcoming any stress produced in the resin layer. A metal layer having a larger thickness, however, results in a hose which is more expensive, greater in weight and lower in flexibility, while a resin layer having a smaller thickness results in a hose which is so low in mechanical strength as to collapse easily when it is assembled.

The Japanese application referred to above discloses (1) a hose having a metal layer thickness of 0.5 mm and a resin layer thickness of 0.5 mm, (2) a hose having a metal layer thickness of 0.2 mm and a resin layer thickness of 0.7 mm, and (3) a hose having a metal layer thickness of 0.7 mm and a resin layer thickness of 1 mm. The hoses (1) and (3) are, however, low in flexibility because of their large metal layer thickness, though they are good in fluid impermeability. A serious problem on a metal-composite corrugated hose is usually the fatigue failure of the metal layer in its corrugated portion as a result of its repeated vibration and deformation, and it is necessary to reinforce it effectively with a resin layer.

The inventors of this invention have, however, found that the resin layers in all of the hoses (1) to (3) are too small in thickness to reinforce the metal layers satisfactorily and protect them from fatigue failure.

SUMMARY OF THE INVENTION

It is an object of this invention to provide a metal-composite corrugated hose which is highly impermeable to carbon dioxide, hydrogen, or any other fluid tending to leak easily by permeation, as well as conforming to stricter regulations prohibiting the leakage of fuel.

It is another object of this invention to provide a metal-composite corrugated hose which is sufficiently flexible for easy assembling and effective absorption of vibration, and at the same time sufficiently strong not to collapse when it is assembled.

It is still another object of this invention to provide a metal-composite corrugated hose having a resin layer which can reinforce a metal layer effectively against fatigue failure.

It is a further object of this invention to provide a process which can manufacture a metal-composite corrugated hose not having any of the drawbacks as pointed out before in connection with the prior Japanese application.

The inventors have found that it is important to select a metal layer thickness A and a resin layer thickness B each falling within a specific range and having a specific ratio to the other to obtain an improved metal-composite corrugated hose. The inventors have also invented a novel process for manufacturing an improved metal-composite corrugated hose.

According to a first aspect of this invention, there is provided a metal-composite corrugated hose having a wall comprising a metal layer as its innermost layer and a resin layer surrounding it, wherein the wall is at least partly corrugated and has in its corrugated portion a metal layer thickness A of at least 20 $\mu$m, but below 200 $\mu$m and a resin layer thickness B of 80 to 5,000 $\mu$m, each thickness of A and B having a ratio (A:B) of 1:4 to 1:50.

The metal layer having a thickness A of at least 20 $\mu$m in its wall portion to be corrugated can be corrugated satisfactorily without having any defects such as pinholes, while ensuring the impermeability of the hose to fuel, carbon dioxide, hydrogen, etc. Its thickness A below 200 $\mu$m ensures the flexibility of the hose to enable easy assembling and effective absorption of vibration. The resin layer has a thickness B of at least 80 $\mu$m which is satisfactorily large to ensure that the hose be strong enough not to collapse when it is assembled. Its thickness B not exceeding 5,000 $\mu$m is small enough not to add undesirably to the weight of the hose.

As the resin layer thickness B is at least four times larger than the metal layer thickness A, the metal layer is not too large in thickness as compared with the resin layer, nor is the resin layer too small in thickness. Therefore, the resin layer can reinforce the metal layer very effectively to protect it from any fatigue failure resulting from the repeated vibration and deformation of the corrugated portion of the hose. The thickness B which is not over 50 times as large as A is not so large as to add undesirably to the weight of the hose. As the metal and resin layers have a good proportion in thickness to each other, the metal layer can maintain its corrugated shape by overcoming any stress produced in the resin layer, even if the hose may be manufactured by a known process as described in the prior Japanese application cited before. It is, however, more preferable to employ a process according to a third or sixth aspect of this invention for manufacturing the hose.

According to a second aspect of this invention, the metal and resin layer thicknesses A and B have a ratio of 1:4.5 to 1:10. This is a range in which the resin layer can reinforce the metal layer still more effectively without adding undesirably to the weight of the hose.

According to a third aspect of this invention, there is provided a process for manufacturing a metal-composite corrugated hose comprising the steps of:

(1) molding a resin hose having an at least partly corrugated wall from a thermoplastic resin;

(2) applying an adhesive to the inner surface of the resin hose; and (3) fitting the resin hose in a hydro-forming mold having a correspondingly corrugated surface, inserting a metal tube into the resin hose and applying a hydro-forming pressure to the metal tube, thereby forming a metal-composite corrugated hose having an at least partly corrugated wall comprising a metal layer defining its innermost layer and a resin layer surrounding it.

The process can be carried out without having any limitation imposed by the resin or metal layer thickness as encountered by the known process. There is no longer any problem in the formation of a corrugated shape even with a relatively small metal layer thickness, or a relatively large resin layer thickness. As it is possible to form both a resin and a metal layer with a desirable thickness, it is possible to avoid any metal layer thickness that would be so large as to add to the cost and weight of the hose and lower its flexibility, and it is also possible to avoid any resin layer thickness that would be so small as to lower the mechanical strength of the hose. The process ensures a high production efficiency, since it is easy to form a corrugated resin hose of high dimensional accuracy and bond a metal layer to its inner surface.

According to a fourth aspect of this invention, the hose has in its corrugated wall portion a metal layer thickness A of at least 20 μm, but below 200 μm and a resin layer thickness B of 300 to 5,000 μm. Although the resin layer thickness may generally be still smaller, and range from 80 to 5,000 μm, it is advisable to take into account any possible damage that may occur to the resin layer if the metal tube is subjected to hydro-forming in a corrugated resin hose as according to the third aspect of this invention. Thus, the resin layer preferably has a thickness of 300 to 5,000 μm.

According to a fifth aspect of this invention, an outer surface of the metal tube to be subjected to hydro-forming according to a third or fourth aspect is treated in advance for improved adhesion to the resin hose. Thus, the fifth aspect of this invention enables further improved adhesion between the resin and metal layers.

According to a sixth aspect of this invention, there is provided a process for manufacturing a metal-composite corrugated hose comprising the steps of:

(4) shaping a metal tube so that it may have an at least partly corrugated wall; and (5) forming a layer of a thermoplastic resin by powder coating or thermal spraying on the outer surface of the metal tube, thereby forming a metal-composite corrugated hose having an at least partly corrugated wall comprising a metal layer defining its innermost layer and a resin layer surrounding it.

The process can be carried out without having any limitation imposed by the resin or metal layer thickness as encountered by the known process. There is no longer any problem in the formation of a corrugated shape even with a relatively small metal layer thickness, or a relatively large resin layer thickness. As it is possible to form both a resin and a metal layer with a desirable thickness, it is possible to avoid any metal layer thickness that would be so large as to add to the cost and weight of the hose and lower its flexibility, and it is also possible to avoid any resin layer thickness that would be so small as to lower the mechanical strength of the hose. The process is suitable for forming a resin layer having a still smaller thickness still more accurately.

According to a seventh aspect of this invention, the hose of the sixth aspect has in its corrugated wall portion a metal layer thickness A of at least 20 μm, but below 200 μm and a resin layer thickness B of 80 to 1,500 μm. Although the resin layer thickness may generally have to be still larger and range from 80 to 5,000 μm, the process according to the seventh aspect of this invention does not impose any limitation on the resin layer thickness, but allows it to be smaller and range from 80 to 1,500 μm to thereby enable a reduction in weight of the hose.

According to an eighth aspect of this invention, the resin layer to be formed on the outer surface of the metal tube according to the sixth or seventh aspect is treated in advance for improved adhesion to the resin layer. Thus, the eighth aspect of this invention enables further improved adhesion between the resin and metal layers.

The above and other features and advantages of this invention will become more apparent from the following description.

BRIEF DESCRIPTION OF THE DRAWINGS

The FIGURE depicts an embodiment of the invention.

Figure 1:
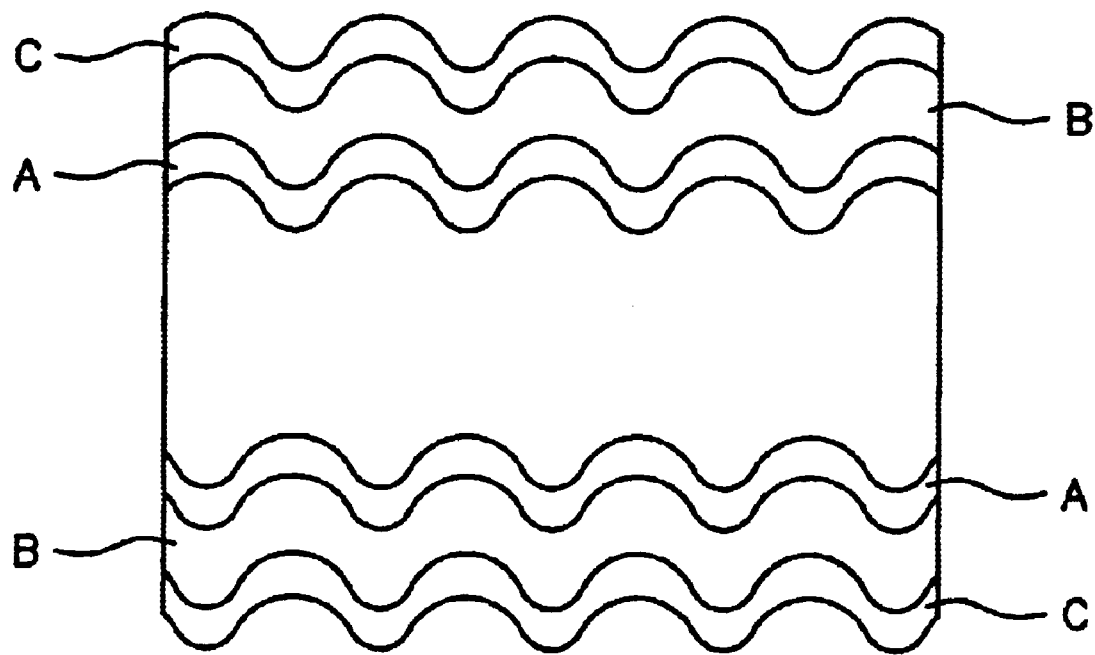

DETAILED DESCRIPTION OF THE INVENTION (Metal-Composite Corrugated Hoses)

The metal-composite corrugated hose of this invention has a multilayer wall which is at least partly or mostly corrugated, while the remaining portion thereof is smooth (straight or curved). The wall includes at least a metal layer as its innermost layer and a resin layer surrounding it. The resin layer may or may not be surrounded by any protective layer formed from, for example, rubber, a urethane foam, or a thermoplastic elastomer.

The hose may be used for conveying various kinds of fluids. The fluids may be a liquid or gas, and include gasoline, alcohol, hydrogen gas, natural gas, propane gas and refrigerant gases, such as chlorofluorocarbons and carbon dioxide. More specifically, the hose can be used as, for example, a fuel hose in a motor vehicle or house, a refrigerant hose, or an air hose in a motor vehicle.

(Metal and Resin Layers)

The metal layer forms the innermost wall layer of the hose as a barrier of very high fluid impermeability. The resin layer surrounds the metal layer and serves mainly as a reinforcing layer. The resin layer is effective for various reinforcing purposes, and is expected to, for example, support the hose during its assembling to retain its shape, protect the metal layer from fatigue failure, particularly in its corrugated portion, and protect it against corrosion.

The metal layer is preferably of stainless steel, iron, aluminum, or copper. Stainless steel is, among others, preferred for its high strength and corrosion resistance. In view of its purposes as stated, the metal layer has a thickness A of at least 20 μm, but below 200 μm.

The resin layer is of a thermoplastic resin. A polyolefin, polyester or polyamide resin is preferred for a good balance of heat resistance, physical properties and flexibility. Specific examples include polyethylene (PE), polypropylene (PP), polyketone, polybutylene terephthalate (PBT), polyamide 6 (PA6), polyamide 11 (PA11) and polyamide 12 (PA12). In view of its purposes as stated, the resin layer has a thickness B of 80 to 5,000 μm, preferably 300 to 5,000 μm for the hose made by the process according to the third aspect of this invention, or 80 to 1,500 μm for the hose made by the process according to the sixth aspect thereof.

The metal and resin layer thicknesses A and B have a ratio (A:B) of 1:4 to 1:50, and preferably 1:4.5 to 1:10. If its thickness B is less than four times larger than A, the resin layer may not reinforce the metal layer sufficiently, but may allow it to undergo fatigue failure in its corrugated portion. If B is over 50 times as large as A, however, the resin layer may not give any better reinforcing result, but may add undesirably to the weight of the hose. A ratio A:B of 1:4.5 to 1:10 is appropriate for a light hose having a metal layer which is less liable to fatigue failure.

(Process for Manufacturing a Metal-Composite Corrugated Hose)

The hose of this invention is preferably manufactured by the process according to the third or sixth aspect of this invention, though any other process may be employed.

(Process According to the Third Aspect of the Invention)

A corrugated resin hose is first prepared usually by extrusion or blow molding and by using a corrugator, though other methods may also be available. An adhesive to be applied to inner surface of the resin hose is preferably an epoxy, urethane or phenolic resin adhesive, although not limited. The resin hose is fitted in a hydro-forming mold having a correspondingly corrugated surface. Then, a metal tube is inserted into the resin hose and a hydro-forming pressure is applied to the metal tube. The metal tube is preferably a seamless one made by deep drawing, or a welded one having its welding seam smoothed by drawing with forced lubrication or grinding. Alternatively, a hydro-formed product of a short metal tube is welded or otherwise joined to a straight metal tube to make a tube having a length as desired of a hose.

The metal tube may have its outer surface treated for improved adhesion to the resin hose, so that there may be obtained a metal and a resin layer adhering still more firmly to each other. Such treatment may be given in addition to, or instead of applying an adhesive to resin hose. Examples of such treatment include degreasing, acid treatment, electrolytic etching, primer coating after sandblasting and phosphate coating. For primer coating, it is preferable to use an epoxy, phenolic or urethane resin primer.

(Process According to the Sixth Aspect of the Invention)

A corrugated metal tube is first made, for example, by using corrugating rolls, or by applying a liquid pressure to the inner surface of a metal tube in a hydro-forming mold. The metal tube to be corrugated is preferably prepared by deep drawing, or welding as stated above in connection with the process according to the third aspect of this invention. Alternatively, a corrugated product of a short metal tube may be welded or otherwise joined to a straight metal tube, as stated above. The corrugated metal tube preferably has its outer surface treated in any of a variety of ways for improved adhesion, as stated above. Then, a thermoplastic resin layer is formed on the outer surface of the metal tube by any known powder coating or thermal spraying.

EXAMPLES

[Preparation of Corrugated Hoses]

Metal-composite corrugated hoses of Examples 1 to 8 shown in Table 1, and those of Comparative Examples 1 to 6 and a corrugated resin hose of Comparative Example 7 shown in Table 2 were prepared.

TABLE 1

|   |   | Example 1 | Example 2 | Example 3 | Example 4 | Example 5 | Example 6 | Example 7 | Example 8 |
|---|---|---|---|---|---|---|---|---|---|
|   | Metal tube material | SUS 316L | SUS 316L | SUS 304 | SUS 304 | SUS 304 | SUS 316L | SUS 316L | SUS 316L |
|   | O.D. (mm) | 36 | 49 | 36 | 36.5 | 8 | 36 | 36 | 36 |
|   | I.D. (mm) | 24 | 35 | 26 | 27.7 | 6 | 24 | 24 | 24 |
| A | Inner metal layer thickness (μm) | 100 | 150 | 120 | 180 | 20 | 30 | 60 | 150 |
|   | Number of ridges | 10 | 23 | 32 | 15 | 15 | 10 | 25 | 15 |
|   | Pitch between ridges (mm) | 6 | 6 | 6 | 6 | 6 | 6 | 6 | 6 |
| B | Outer resin layer thickness (μm) |   |   |   |   |   |   |   |   |
|   | PA11 | 500 | 900 | — | — | 80 | — | — | — |
|   | PA12 of low plasticity | — | — | — | — | — | 950 | — | — |
|   | LLDPE | — | — | 600 | — | — | — | — | — |
|   | Fluororesin | — | — | — | 720 | — | — | — | — |
|   | TPO | — | — | — | — | — | — | 3000 | 5000 |
|   | B/A | 5.0 | 6.0 | 5.0 | 4.0 | 4.0 | 32 | 50 | 33 |
|   | Axial spring constant N/mm | 3.9 | 5.8 | 2.3 | 24.2 | 1.2 | 3.5 | 3.5 | 12.6 |
|   | Falling weight test | No collaps- | No collaps- | No collaps- | No collaps- | Restored after | No collaps- | No collaps- | No collaps- |

TABLE 1-continued

|  | | Example 1 | Example 2 | Example 3 | Example 4 | Example 5 | Example 6 | Example 7 | Example 8 |
|---|---|---|---|---|---|---|---|---|---|
| | (0.45 kg, 0.3 m) | ing | ing | ing | ing | collaps-ing | ing | ing | ing |
| | Vibration fatigue resistance (± 15°, 15 Hz) (No. of oscillations | $10^6<$ | $10^6<$ | $10^6<$ | $10^6<$ | $10^6<$ | $10^6<$ | $10^6<$ | $10^6<$ |
| | Fuel impermeability at 60° C. (mg/7 days) | 0 | 0 | 0 | 0 | 0 | 0 | 0 | 0 |

TABLE 2

| | | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|
| | Metal tube material | SUS 304 | C5210 | SUS 316L | SUS 304 | SUS 316L | SUS 316L | — |
| | O.D. (mm) | 28 | 14 | 35 | 39 | 36 | 36 | 35 |
| | I.D. (mm) | 21 | 9.6 | 26 | 31.6 | 24 | 24 | 30 |
| A | Inner metal layer thickness ($\mu$m) | 500 | 200 | 300 | 700 | 30 | 300 | — |
| | Number of ridges | 5 | 5 | 15 | 5 | 10 | 10 | 10 |
| | Pitch between ridges (mm) | 6 | 6 | 6 | 6 | 6 | 6 | 6 |
| B | Outer resin layer thickness ($\mu$m) | | | | | | | |
| | PA11 | 500 | 700 | 950 | 1000 | 50 | 6000 | 900 |
| | B/A | 1 | 3.5 | 3.2 | 1.4 | 1.7 | 20.0 | — |
| | Axial spring constant (N/mm) | 2200 | 210 | 112 | 7600 | 0.1 | 1700 | 15.7 |
| | Falling weight test (0.45 kg, 0.3 m) | No collaps-ing | No collaps-ing | No collaps-ing | No collaps-ing | collaps-ed | No collaps-ing | No collaps-ing |
| | Vibration fatigue resistance (± 15°, 15 Hz) (No. of oscillations) | Inflexible | $2 \times 10^2$ | $5 \times 10^4$ | Inflexible | $10^6<$ | Inflexible | $10^6<$ |
| | Fuel impermeability at 60° C. (mg/7 days) | 0 | 0 | 0 | 0 | 0 | 0 | 0.1 |

The hoses according to Examples 1, 2, 4 and 5 and Comparative Examples 1 to 5 were each prepared by making a corrugated metal tube by an appropriate method and forming a resin layer on its outer surface by electrostatic powder coating. The hose according to Example 3 was prepared by making a corrugated metal tube and forming a resin layer on its outer surface by thermal spraying.

The hoses according to Example 6 and Comparative Example 6 were each prepared by making a corrugated resin hose, applying an adhesive to its inner surface, inserting a metal tube therein and applying a hydro-forming pressure to the metal tube to form a metal layer.

The hoses according to Examples 7 and 8 were each prepared by forming a corrugated resin hose by injection molding from TPO (a thermoplastic elastomer of the olefin series, i.e. SANTOPRENE of Monsanto Co.), applying an adhesive to its inner surface, inserting a metal tube therein and applying a hydro-forming pressure to the metal tube to form a metal layer. The hose according to Comparative Example 7 was a simple corrugated resin hose.

Every hose had an axially middle corrugated portion and two smooth and straight end portions and had an overall length of 160 to 300 mm. The characteristics of its corrugated portion are shown by the number of ridges and the pitch between ridges in Table 1 or 2. The number of ridges multiplied by the pitch (mm) is equal to the length of the corrugated portion.

The metal-composite corrugated hose according to Examples 1 to 8 and Comparative Examples 1 to 6 is constituted of the inner metal layer and the resin layer surrounding it, and the resin corrugated hose according to the Comparative Example 7 is constituted only of the resin layer.

In Tables 1 and 2, O.D. and I.D. mean the outside and inside diameters, respectively, of the corrugated portion of each hose. The flexibility of a corrugated hose generally depends largely on the difference between the outside and inside diameters of its corrugated portion. According to this invention, therefore, every hose was so corrugated as to have a sufficient difference between the outside and inside diameters of its corrugated portion as shown in Table 1, while the metal layer was so reinforced as not to have its flexibility lowered by the residual stress in the resin layer. Every hose according to this invention was also characterized by not having any defective adhesion caused by a shearing force produced between its metal and resin layers.

In Table 1 or 2, the inner metal layer thickness A is the thickness of the metal layer formed from the material shown, i.e. stainless steel SUS316L or SUS304, or copper C5210, all according to JIS.

In Table 1, the outer resin layer thickness B is the thickness of the resin layer formed from any of the materials shown from PA11 to TPO. PA11 means polyamide 11, PA12 of low plasticity means polyamide 12 containing 5% by weight of a plasticizer, and LLDPE means linear low-density polyethylene.

The hose according to every Comparative Example had a resin layer formed from PA11 and having the thickness shown in Table 2. In Table 1 or 2, B/A means the ratio of the resin layer thickness B to the metal layer thickness A.

[Evaluation of Corrugated Hoses]

Each hose was compressed by a length of 10 mm at a test speed of 50 mm per minute by using a Strograph V10B of Toyo Seiki Seisakusho, Ltd., and its axial spring constant (N/mm) was calculated from its compressive stress. The results are shown in Table 1 or 2.

Then, a falling weight impact strength test was conducted on each hose in accordance with JASO M317 to see if its corrugated shape would collapse. A short pin having a diameter of 32 mm and terminating in a semispherical lower end having a diameter of 32 mm was erected on the corrugated portion of the hose held at a standstill on a floor and a weight of 450 g was caused to fall down on the pin from a height of 30 cm. The results are shown in Table 1 or 2. The hose according to Example 5 collapsed, but restored its corrugated shape upon removal of the load.

Then, each hose was evaluated for its vibration fatigue resistance by means of a hydraulic servo fatigue testing machine, Model FT-1, of Saginomiya Seisakusho, Inc. The hose was fixed at one end, and was caused to oscillate at the other end at a frequency of 15 Hz within a flex angle of plus or minus 15 degrees relative to its longitudinal axis. The results are shown in Table 1 or 2 by the number of oscillations at which the hose cracked in its inner metal, or outer resin layer. Each value accompanied by a sign of inequality "<" means the number of oscillations which could be reached without any such cracking. The term "inflexible" means that the hose was too hard to overcome the capacity of the fatigue testing machine.

Finally, each hose was evaluated for its fuel impermeability. The hose was filled with Fuel C as specified by JIS K6258 (a mixture containing toluene and isooctane in a volume ratio of 50:50), and closed tightly at both ends. After it had been left to stand at a temperature of 60° C. for a week, it was emptied, and filled again with new Fuel C. The total weight of the hose including the fuel was measured as X (mg) after a week, and as Y (mg) after another week, and their difference (X−Y) was obtained as a measure of the fuel impermeability of the hose. The results are shown in Table 1 or 2. No such difference was found except in Comparative Example 7.

While the invention has been described by way of its preferred embodiments, it is to be understood that variations or modifications may be easily made by those skilled in the art without departing from the scope of this invention which is defined by the appended claims.

What is claimed is:

1. A metal-composite corrugated hose having a wall comprising a metal layer defining its innermost layer and a resin layer surrounding it, wherein the wall is at least partly corrugated and has in its corrugated portion a metal layer thickness A of at least 20 $\mu$m, but below 200 $\mu$m and a resin layer thickness B of 80 to 5,000 $\mu$m, each thickness of A and B having a ratio (A:B) of 1:4 to 1:50.

2. The hose according to claim 1, wherein the ratio (A:B) is from 1:4.5 to 1:10.

3. The hose according to claim 1, wherein the wall further comprises a protective layer surrounding the resin layer.

4. The hose according to claim 3, wherein the protective layer is of a material selected from the group consisting of rubber, a urethane foam and a thermoplastic elastomer.

5. The hose according to claim 1, wherein the hose is useful for conveying gasoline, alcohol, hydrogen gas, natural gas, propane gas, or a refrigerant gas.

6. The hose according to claim 1, wherein the hose is a fuel or refrigerant hose, or an air hose for a motor vehicle.

7. The hose according to claim 1, wherein the metal layer is of a material selected from the group consisting of stainless steel, aluminum and copper.

8. The hose according to claim 1, wherein the resin layer is of a material selected from the group consisting of a polyolefin resin, a polyester resin and a polyamide resin.

9. The hose according to claim 1, wherein the resin layer is of a material selected from the group consisting of polyethylene, polypropylene, polyketone, polybutylene terephthalate, polyamide 6, polyamide 11 and polyamide 12.

10. A metal-composite corrugated hose, which is manufactured by a process comprising the steps of:

molding a resin hose having an at least partly corrugated wall from a thermoplastic resin;

applying an adhesive to the inner surface of the resin hose; and fitting the resin hose in a hydro-forming mold having a correspondingly corrugated surface, inserting a metal tube into the resin hose and applying a hydro-forming pressure to the metal tube, to form the metal-composite corrugated hose having an at least partly corrugated wall comprising a metal layer defining its innermost layer and a resin layer surrounding it, wherein the wall is at least partly corrugated and has in its corrugated portion a metal layer of thickness A, which is at least 20 $\mu$m, but below 200 $\mu$m, and a resin layer of thickness B, which is from 80 to 5,000 $\mu$m, each thickness of A and B having a ratio (A:B) of from 1:4 to 1:50.

11. A metal-composite corrugated hose, which is manufactured by a process comprising the steps of:

shaping a metal tube so that it may have an at least partly corrugated wall; and forming a layer of a thermoplastic resin by powder coating or thermal spraying on the outer surface of the metal tube, to form the metal-composite corrugated hose having an at least partly corrugated wall comprising a metal layer defining its innermost layer and a resin layer surrounding it, wherein the wall is at least partly corrugated and has in its corrugated portion a metal layer of thickness A, which is at least 20 $\mu$m, but below 200 $\mu$m, and a resin layer of thickness B, which is from 80 to 5,000 $\mu$m, each thickness of A and B having a ratio (A:B) of from 1:4 to 1:50.

* * * * *